(12) United States Patent
Meche

(10) Patent No.: US 6,871,072 B1
(45) Date of Patent: *Mar. 22, 2005

(54) METHODS AND APPARATUS FOR SUPPORTING OPTIMUM CALL ROUTING IN A CELLULAR TELECOMMUNICATIONS SYSTEM

(75) Inventor: Paul S Meche, Richardson, TX (US)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/933,911

(22) Filed: Sep. 23, 1997

(51) Int. Cl.[7] .................................................. H04Q 7/20

(52) U.S. Cl. .................... 455/445; 455/432.1; 455/433; 455/435.1

(58) Field of Search .................... 455/445, 432.1–432.3, 455/433, 435.1, 458, 459, 460, 461

(56) References Cited

U.S. PATENT DOCUMENTS

| | | | |
|---|---|---|---|
| 5,175,758 A | 12/1992 | Levanto et al. | 379/57 |
| 5,394,391 A | 2/1995 | Chen et al. | 370/18 |
| 5,898,922 A | * 4/1999 | Reininghaus | 455/433 |

FOREIGN PATENT DOCUMENTS

WO 96/20574 * 4/1996 ............ H04Q/7/38

* cited by examiner

Primary Examiner—Lee Nguyen
(74) Attorney, Agent, or Firm—Harrington & Smith, LLP

(57) ABSTRACT

Disclosed are methods for operating a wireless terminal or mobile station in a wireless telecommunications system. A first method includes steps of (a) transmitting a telephone number that includes an identifier for specifying that a user of the mobile station is calling a second mobile station that is believed to be roaming in a current serving system; (b) receiving the telephone number in the current serving system, typically at a mobile switching center (MSC); (c) detecting the presence of the identifier and, in response, determining if the telephone number is one that is stored in a Visitor Location Register (VLR) of the current serving system. If yes, the method includes a step (d) of paging the second mobile station in the current serving system. In one embodiment the step of transmitting includes an initial step of entering an identifier character into a memory of the mobile station, followed by the telephone number of the second mobile station. In a second embodiment the step of transmitting includes an initial step of entering the telephone number of the second mobile station into the memory of the mobile station, followed by the identifier character. In a second method the MSC automatically determines if a received telephone number is one that is associated with a potential roamer. If yes, the MSC checks to see if the telephone number is present in the MSC's VLR. If yes, the mobile station associated with the telephone number is paged.

8 Claims, 4 Drawing Sheets

METHODS AND APPARATUS FOR SUPPORTING OPTIMUM CALL ROUTING IN A CELLULAR TELECOMMUNICATIONS SYSTEM

FIELD OF THE INVENTION

This invention relates generally to radiotelephones and, in particular, to radiotelephones or mobile stations such as those capable of operation with a cellular network.

BACKGROUND OF THE INVENTION

Occasions arise wherein a user of a first radiotelephone, such as a cellular telephone, desires to contact a user of a second radiotelephone who is known to be or believed to be roaming within a service area of the first user. For example, the first user can be in a service area within the Los Angeles area, while the second user may be an acquaintance or business associate from Miami who is known to be or believed to be in the Los Angeles area. Under conventional practice the first user can dial the number of the second user. A mobile switching center (MSC) that handles the call will recognize the area code for Miami and will route the call to a MSC in the Miami area. The Miami MSC will find from its Home Location Register (HLR) that the second user is actually roaming in the Los Angeles area, and will route the call back to the Los Angeles MSC. It can be appreciated that this technique is not efficient, and furthermore can result in the users incurring significant long distance charges for a call that may be required to go only a few blocks.

It is also known in the art to provide a two-stage dialing approach using local roamer access ports. These telephone numbers were known to be published (and may still be published) on a system by system basis throughout the United States. The result was a small book that was typically out of date due to area code changes, etc. In this system, one looked up the system and the area (there were only two systems in this method, not the seven that resulted from the PCS spectrum auction), then dialed that local number, then waited for a second dial tone, and then dialed the called party number. As can be appreciated, this technique also does not provide an optimum solution for contacting roaming users.

OBJECTS OF THE INVENTION

It is thus a first object and advantage of this invention to provide an improved method for contacting a roaming user that is simpler, more user-friendly, and that does not require one to have knowledge of local access numbers.

It is a further object and advantage of this invention to provide a method for contacting a roaming user, wherein an identifying code is prepended or appended to a dialed telephone number and transmitted from a radiotelephone, wherein a MSC that detects the code examines its Visitor Location Register (VLR) to determine if the called number is a number that is valid for an active roaming user, and wherein the MSC then connects the call to the roaming user without requiring that a long distance call be made.

It is another object and advantage of this invention to provide a method for contacting a roaming user, wherein a MSC that detects that a dialed telephone number may be associated with a roaming user automatically examines its Visitor Location Register (VLR) to determine if the called number is a number that is valid for an active roaming user, and wherein the MSC then connects the call to the roaming user without requiring that a long distance call be made.

SUMMARY OF THE INVENTION

The foregoing and other problems are overcome and the objects of the invention are realized by methods and apparatus in accordance with embodiments of this invention. Methods of this invention are disclosed for operating a wireless terminal or mobile station in a wireless telecommunications system, such as a cellular telecommunications system.

A first method includes steps of (a) transmitting a telephone number that includes an identifier for specifying that a calling party is calling a mobile station that is believed to be roaming in a current serving system; (b) receiving the telephone number in the current serving system, typically at a mobile switching center (MSC); (c) detecting the presence of the identifier and, in response, determining if the called party has a number that is available in a Visitor Location Register (VLR) of the current serving system; and, if yes, (d) paging the called mobile station in the current serving system.

In one embodiment the step of transmitting includes an initial step of entering an identifier character, followed by the telephone number of the called mobile station. In a second embodiment the step of transmitting includes an initial step of entering the telephone number of the called mobile station, followed by the identifier character.

A second method includes steps of (a) transmitting a telephone number from a calling party that is calling a mobile station that is believed to be roaming in a current serving system; (b) receiving the telephone number in the current serving system, typically at the mobile switching center; (c) determining if the telephone number may be associated with a roaming user and, if yes, determining if the called party has a number that is available in a Visitor Location Register (VLR) of the current serving system; and, if yes, (d) paging the called mobile station in the current serving system.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
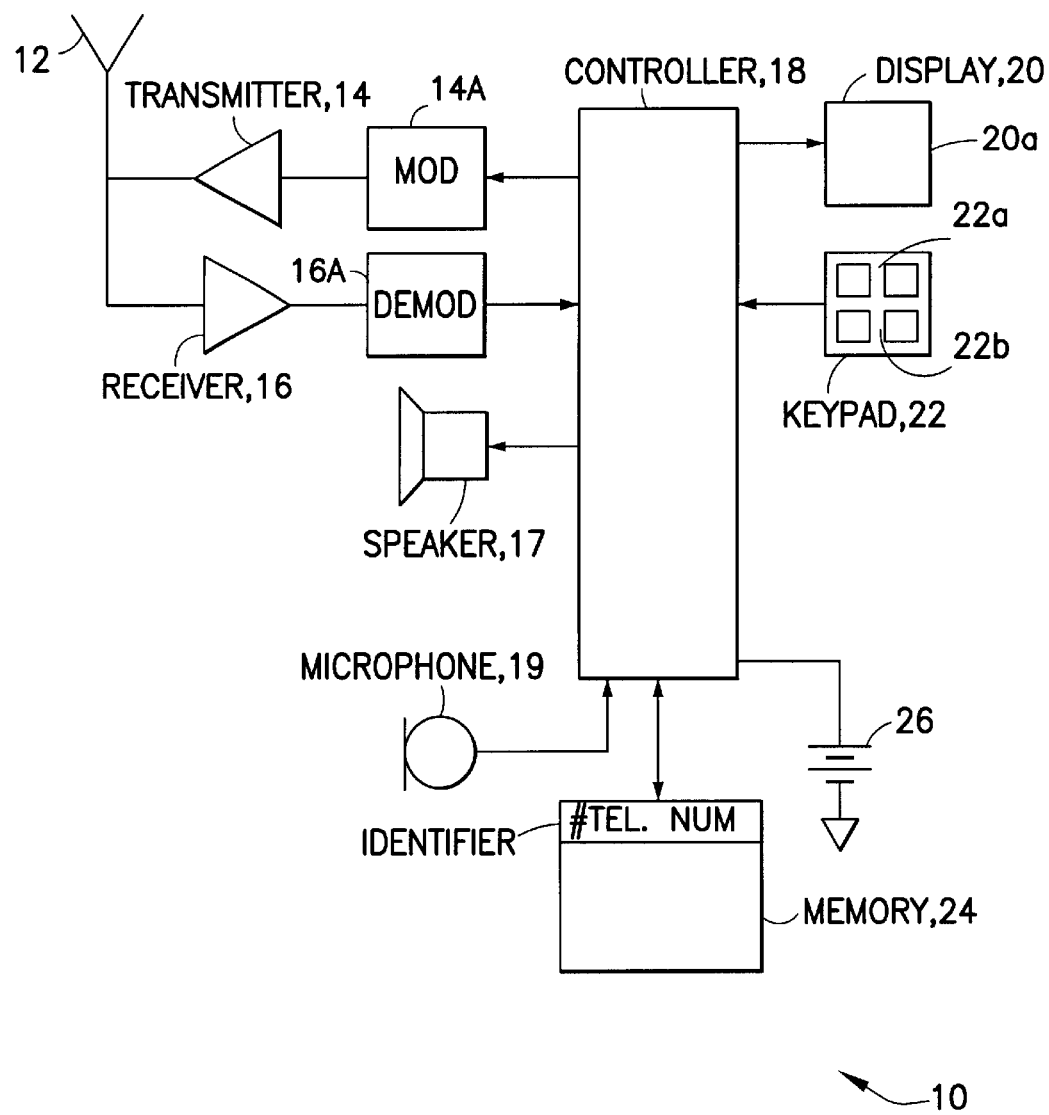
FIG. 1 is a block diagram of a mobile station that is constructed and operated in accordance with this invention.
Figure 2:
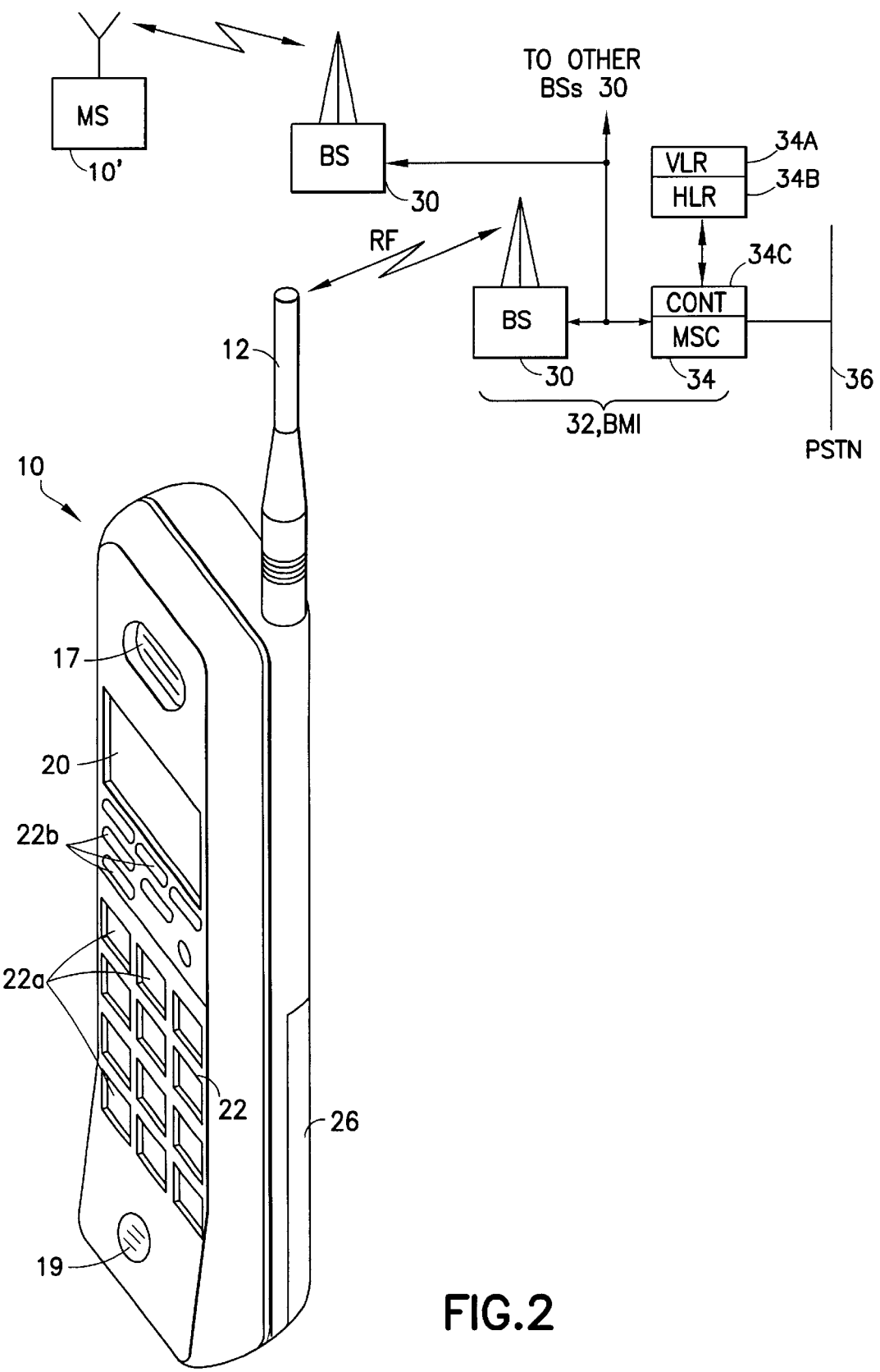
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network that may comprise a Base Station/Mobile Switching Center/Interworking function (BMI) 32 that includes a mobile switching center (MSC) 34.

The MSC 34 provides a connection to landline trunks, such as the Public Switched Telephone Network (PSTN) 36, when the mobile station 10 is involved in a call. Typically the MSC 34 will be bidirectionally coupled to a plurality of base stations 30 in a service area, each of the base stations 30 serving an associated cell. The MSC 34 includes a Visitor Location Register (VLR) 34A, wherein the identities (typically the telephone numbers) of authorized roaming mobile stations are recorded after registering with the MSC 34, a Home Location Register (HLR) 34B, wherein are recorded the identities of those mobile stations that are associated with the MSC 34 in a "home" or normal serving system mode of operation, and a data processor or controller 34C that implements a MSC method in accordance with this invention.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for the purposes of this invention to include any suitable physical and logical structure, and may be a conventional analog AMPS air interface or a digital air interface, such as a TDMA interface (e.g., IS-136 compatible) or a CDMA air interface (e.g., IS-95 compatible). Dual mode (e.g., AMPS/TDMA or AMPS/PCS) mobile stations may also take advantage of the teachings of this invention. The mobile station 10 can be a vehicle mounted or a handheld device. It should further be appreciated that the mobile station 10, as was described above, can be capable of operating with one or more air interface standards, modulation types, and access types.

The controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores dialed telephone numbers prior to their transmission to the base station 30, as well as the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 also includes software routines for implementing the methods described below in relation to FIGS. 3 and 4.

Figure 3:
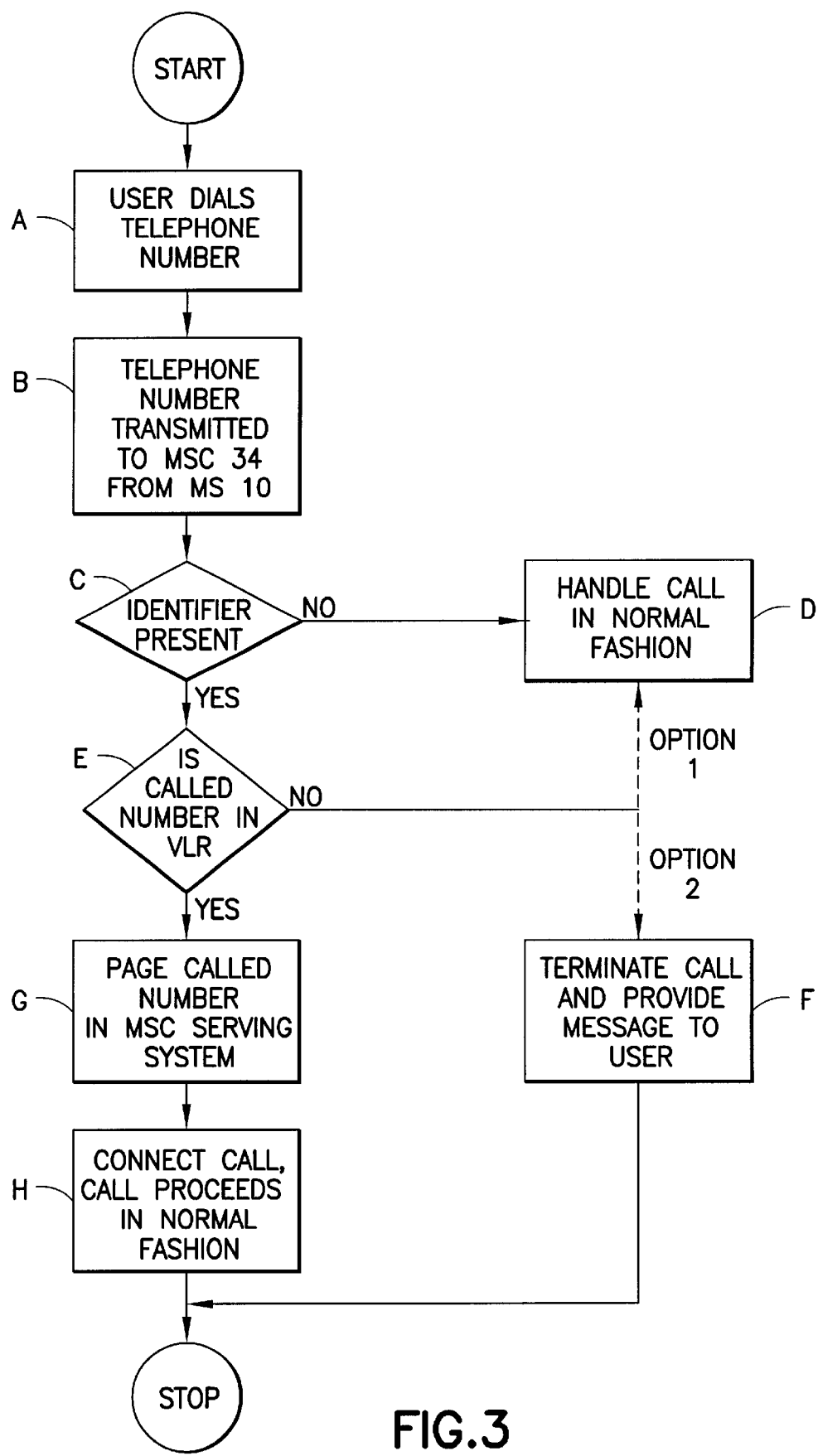
FIG. 3 is a logic flow diagram that is descriptive of a first method in accordance with this invention.

Reference is now made to FIG. 3 for illustrating a first method in accordance with this invention.

At Block A the user dials a number using the keypad 22. It is assumed that the mobile station 10 has already registered with the MSC 34. It is further assumed that the user is calling the mobile station 10', which is known to be or is believed may be roaming in the system served by MSC 34. As such, the dialed telephone number is a number outside of the range of telephone numbers served by the MSC 34. In accordance with this embodiment of the invention the user either adds as a prefix (prepends) or as a suffix (appends) a 'pre-translation' identifier, such as the character '#', to the dialed telephone number. For example, the user dials '#1 203 555 1212', where '1' is the country code and '555' is the exchange, where the '203' area code is not one that is associated with the MSC 34, and where the '#' character is the defined pre-translation identifier character. The entered identifier character and the telephone number are stored temporarily in the memory 24 of the mobile station 10, in a conventional manner.

At Block B the user depresses the SEND key on the keypad 22, or performs some other action, for causing the mobile station 10 to transmit the stored telephone number and pre-translation identifier character to the MSC 34, via the base station 30 having a cell within which the mobile station 10 is currently located. The telephone number and identifier is then received at the MSC 34.

At Block C the controller 34C of the MSC 34 parses or otherwise examines the received telephone number. For the case where the pre-translation identifier is not present, control passes to Block D to handle the call in a normal fashion. However, if the controller 34C detects the presence of the pre-translation identifier, control passes instead to Block E where the controller 34C examines the VLR 34A to determine if the telephone number of the called party is present. More particularly, the MSC controller 34C determines if the called party is active and valid (authorized to receive service in the serving system of the MSC 34). If no, control passes, in one embodiment, to Block D where the call is completed in a normal fashion. For example, the MSC 34 signals the MSC of the serving system of the called telephone number, and an attempt is made to complete the call through the PSTN 36. In this case a long distance and possibly other charges may be incurred. In a second embodiment a digital or audio message is sent to the mobile station 10 (Block F) to indicate that the called party is not available. For example, the called party may not have yet turned on his or her mobile station 10' and registered with the MSC 34, or the called party attempted to register as a roamer with the MSC 34 but was denied service, or the called party is not actually roaming as the calling party expected.

During the execution of Block F the call can be automatically terminated by the MSC 34 or, instead, the user may be given an option to (a) simply terminate the call (such as by hanging up) or (b) to instead complete the call using conventional call completion techniques. In the former case the user of the mobile station 10 may simply elect to wait and try the call later, or may use some other means to contact the called party, such as through a conventional landline call. In the latter case an attempt to reach the called party can be made by using conventional cellular long distance calling techniques (e.g., control passes back to Block D after the user enters an appropriate code using the keypad 22).

Returning to Block E, and for the case where the called number is found in the VLR 34A, control passes to Block G where the controller 34C causes one or more of the base stations 30 to transmit a page message indicating that the mobile station 10' has an incoming call. Assuming that the user of the mobile station 10' answers the call (e.g., the mobile station 10' generates an alerting or ringing tone and the user depresses the SEND or some other key to answer the call), then control passes to Block H to connect the call as an intra-system call from the mobile station 10 to the mobile station 10' using the same or a different base station 30, depending on the location of the mobile station 10'.

Figure 4:
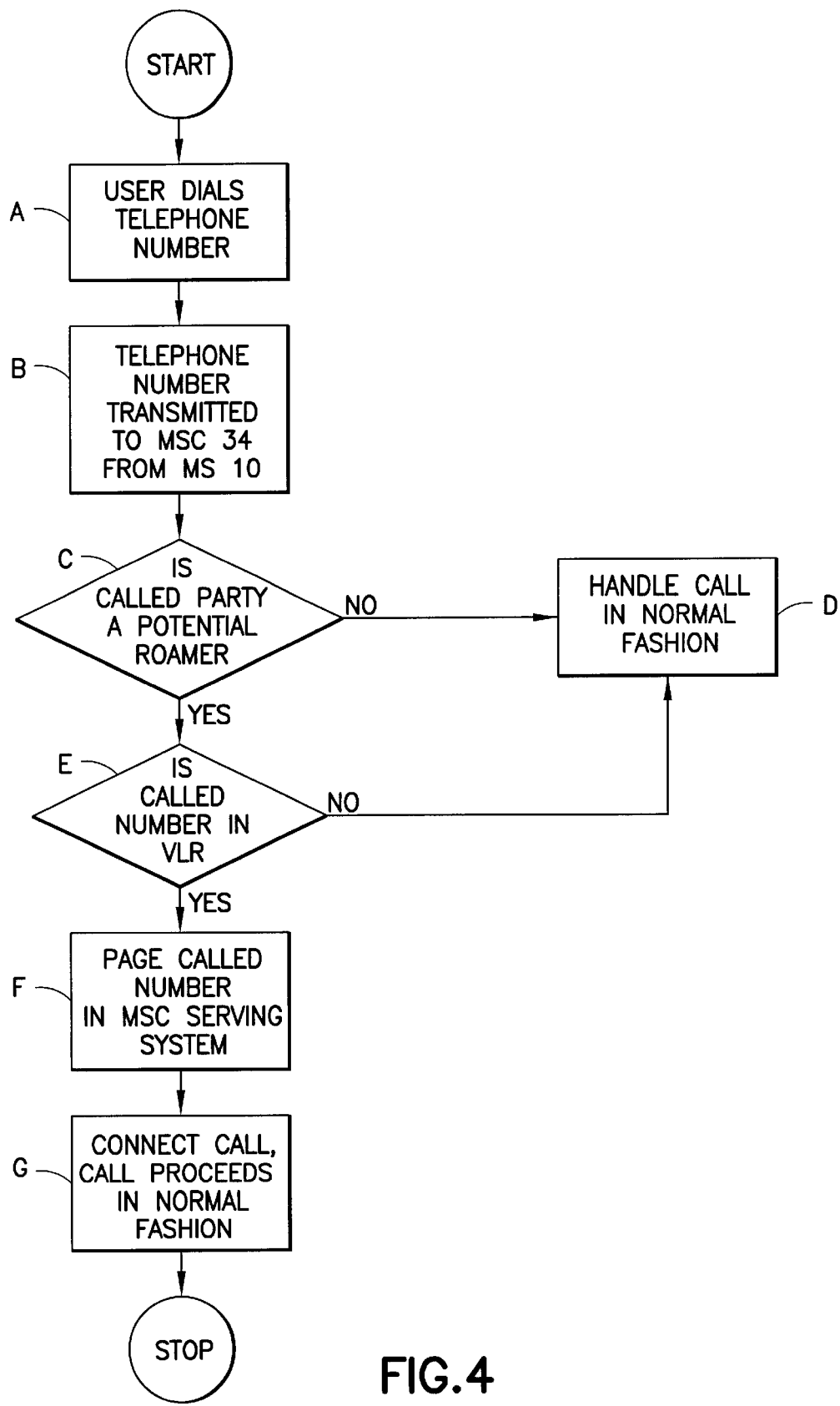
FIG. 4 is a logic flow diagram that is descriptive of a second method in accordance with this invention.

Reference is now made to FIG. 4 for illustrating a second method in accordance with this invention. At Block A the user dials a number using the keypad 22. As before, it is assumed that the mobile station 10 has already registered with the MSC 34 and that the user is calling the mobile station 10'. In accordance with this second embodiment of the invention the user is not required to either prepend or append one or more pre-translation identifiers.

At Block B the user depresses the SEND key on the keypad 22, or performs some other action, for causing the mobile station 10 to transmit the telephone number to the MSC 34, via the base station 30 having the cell within which the mobile station 10 is currently located. The telephone number is then received at the MSC 34.

At Block C the controller 34C of the MSC 34 parses or otherwise examines the received telephone number. Based on the content of the called number, such as the area code, the controller 34C makes a determination as to whether the called party is a potential roamer. For example, and for the case where area code does not match an area code served by the MSC 34, the called party can be considered a potential roamer in the system served by the MSC 34. For the case where the called party is determined not to be a potential roamer, control passes to Block D to handle the call in a normal fashion. In this case the telephone number of the called party may be present in the HLR 34B of the MSC 34. That is, the called party may be one served by the MSC 34. However, if the controller 34C instead detects at Block C that the called party is a potential roamer, control passes to Block E where the controller 34C examines the VLR 34A to determine if the telephone number of the called party is present. As in the first embodiment, the MSC controller 34C determines if the called party is active and valid (authorized to receive service in the serving system of the MSC 34). If the called number is not present in the VLR 34A, control passes to Block D where the call is completed in a normal fashion.

Returning to Block E, and for the case where the called number is present in the VLR 34A, control passes to Block F where the controller 34C causes one or more of the base stations 30 to transmit a page message indicating that the mobile station 10' has an incoming call. Assuming that the user of the mobile station 10' answers the call then control passes to Block G to connect the call as an intra-system call from the mobile station 10 to the mobile station 10' using the same or a different base station 30, depending on the location of the mobile station 10'.

As should be apparent, one advantage of the use of the teaching of this invention is that it is possible to eliminate long distance charges for the calling and called parties. The use of the this invention also eliminates a need, at least in North American systems, to know the local port for the serving system, and the need to use two stage dialing. As such, the 'user-friendliness' of the cellular system is enhanced, without incurring undue complexity and while reducing unnecessary costs.

Although described in the context of preferred embodiments, it should be realized that a number of modifications to these teachings may occur to one skilled in the art. By example, any suitable character can be used as the pre-translation identifier, such as the '*' character instead of the '#' character, or by the definition of a new character. In other embodiments more than one pre-translation identifier character can be used, such as by prepending or appending both of the '#' and '*' characters to the telephone number of the mobile station 10', or by prepending the '#' character and then appending the '*' character to the telephone number of the mobile station 10'. Of course, care must be taken to minimize conflicts with any previously defined translation characters that may be used for other purposes. As such, it may be desirable in some cases to define a new character for use as the pre-translation identifier.

For the embodiment of FIG. 4, the test in Block C can be refined so as to first determine if the called number is a number associated with a mobile station or with a landline phone. In this embodiment, and only when it is first determined that the called number is associated with a mobile station, is the VLR 34A examined. This embodiment may be more practical to implement in those systems, such as GSM, wherein the numbering plan enables a ready association of a given telephone number with one of a mobile station or a landline phone, and may be less readily implemented under the North American numbering plan.

Also, the teaching of this invention is not limited to making voice calls, in that data calls, messaging, and facsimile transmissions can also be made using the teachings of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless telecommunications system, comprising the steps of:

providing a telephone number and an identifier for specifying that a caller is calling a mobile station that is believed to be roaming in a particular serving system, where providing the telephone number includes an initial step of entering the telephone number of the called mobile station into a memory of a calling mobile station, followed by an identifier character;

receiving said telephone number and said identifier in the serving system;

detecting the presence of said identifier and, in response, without interrogating another serving system, determining if said telephone number is one that is stored in a Visitor Location Register of said serving system; and if yes, paging said mobile station in said serving system.

2. A cellular telecommunications system, comprising:

a first mobile station for transmitting a telephone number that includes an identifier specifying that a user of the first mobile station is calling a second mobile station which is believed to be roaming in a current serving system; and a first base station and mobile switching center (MSC) for receiving the telephone number in the current serving system, said MSC including a controller that detects a presence of the identifier and, in response, determines without interrogating another mobile switching center if the telephone number is one that is stored in a Visitor Location Register of the MSC and, if yes, pages the second mobile station using the first or a second base station, wherein said first mobile station includes a keypad for entering the telephone number of the second mobile station into a memory of the mobile station, followed by an identifier character.

3. A method for operating a wireless telecommunications system, comprising the steps of:

transmitting a telephone number that includes an appended identifier for specifying that a first mobile station is calling a second mobile station that may be roaming in a particular serving system;

receiving the telephone number in the serving system;

detecting the presence of the appended identifier and, in response, without interrogating another serving system, examining a Visitor Location Register of the serving system to determine if the telephone number is one that is associated with a valid roaming mobile station; and if the telephone number is determined to be one that is associated with a valid roaming mobile station, paging the second mobile station in the serving system, else, performing one of completing the call using a conventional call completion technique or sending a message to the first mobile station for indicating that the telephone number is not one that is associated with a valid roaming mobile station.

4. A method as in claim 3, wherein the step of sending a message includes a further step of terminating the call.

5. A method for operating a wireless telecommunications system, comprising the steps of:

providing a telephone number of a called party;

receiving said telephone number in a serving system, the received telephone number having an appended identifier;

in response to detecting the presence of the appended identifier, determining if said telephone number is for a mobile station potentially roaming in the serving system, without interrogating another serving system;

if yes, determining if said telephone number is stored in a Visitor Location Register of the serving system; and if yes, paging the mobile station in the serving system.

6. A cellular telecommunications system, comprising:

a first mobile station for transmitting a telephone number that comprises an appended identifier; and a first base station and mobile switching center (MSC) which receives said telephone number in a serving system, said MSC including a controller which determines based on said appended identifier if said telephone number is associated with a mobile station potentially roaming in said serving system and, without interrogating another mobile switching center, determines if the telephone number is one that is stored in a Visitor Location Register of the MSC and, if yes, pages the roaming mobile station using said first or a second base station.

7. A method for operating a wireless telecommunications system, comprising the steps of:

at a first mobile switching center, receiving a telephone number having an appended identifier, wherein said telephone number is registered in a home location register of a second mobile switching center;

in response to the presence of said appended identifier, checking a visitor location register of said first mobile switching center to determine if said telephone number is a valid roaming number under said first mobile switching center; and paging a roaming mobile station identified with said telephone number;

wherein said home location register of said second mobile switching center is not accessed.

8. A switching center for mobile cellular telecommunications, comprising:

a visitor location register;

a home location register; and a controller that controls message switching to at least one base station;

wherein when a received telephone number having an appended pre-translation identifier is received, said controller looks for said telephone number in said visitor location register without communicating with another mobile switching center, and if said telephone number is found in said visitor location register said controller pages a roaming mobile station associated with said telephone number using said base station.

* * * * *